US012725771B2

(12) United States Patent
Tan et al.

(10) Patent No.: US 12,725,771 B2
(45) Date of Patent: Sep. 1, 2026

(54) ARTIFICIAL CELL FOR SINGLE-CELL MASS SPECTROMETRY (SCMS) MEASUREMENT AND PREPARATION METHOD THEREOF

(71) Applicant: NATIONAL INSTITUTE OF METROLOGY, CHINA, Beijing (CN)

(72) Inventors: Siyuan Tan, Beijing (CN); Xiaoyun Gong, Beijing (CN); Xinchi Yin, Beijing (CN); Zhichao Xue, Beijing (CN); Xinhua Dai, Beijing (CN); Xiang Fang, Beijing (CN)

(73) Assignee: NATIONAL INSTITUTE OF METROLOGY, CHINA, Beijing (CN)

( * ) Notice: Subject to any disclaimer, the term of this patent is extended or adjusted under 35 U.S.C. 154(b) by 453 days.

(21) Appl. No.: 18/569,578

(22) PCT Filed: Sep. 1, 2023

(86) PCT No.: PCT/CN2023/116383
§ 371 (c)(1),
(2) Date: Dec. 12, 2023

(87) PCT Pub. No.: WO2024/192979
PCT Pub. Date: Sep. 26, 2024

(65) Prior Publication Data

US 2024/0420940 A1 Dec. 19, 2024

(30) Foreign Application Priority Data

Mar. 20, 2023 (CN) ......................... 202310272610.6

(51) Int. Cl.
*H01J 49/04* (2006.01)

(52) U.S. Cl.
CPC ................................ *H01J 49/0409* (2013.01)

(58) Field of Classification Search
CPC .................................................. H01J 49/0409
See application file for complete search history.

(56) References Cited

U.S. PATENT DOCUMENTS 10,032,615 B2 * 7/2018 Agar .................. H01J 49/0418
2011/0124520 A1 * 5/2011 Love ........................ C12Q 1/02
506/7

* cited by examiner

*Primary Examiner* — Sean Luck
(74) *Attorney, Agent, or Firm* — FisherBroyles, LLP; Xiaoban Xin

(57) ABSTRACT

The present disclosure provides an artificial cell for single-cell mass spectrometry (SCMS) measurement and a preparation method thereof. In the present disclosure, the artificial cell includes an internal aqueous phase, an intermediate oil phase, and an external aqueous phase; where the internal aqueous phase includes polyethylene glycol (PEG) and a polyvinyl alcohol (PVA) aqueous solution, and the intermediate oil phase includes a chloroform-hexane mixture of L-α-phosphatidylcholine; and the external aqueous phase includes PVA and an F-68 aqueous solution. Compared with natural cell samples, new artificial single cells based on microfluidic self-assembly provided by the present disclosure have better uniformity, stability, and controllability. The artificial cell can effectively avoid significant measurement differences between individual single-cell samples, and effectively solve the problem of difficulty in stably preserving biological samples.

5 Claims, 12 Drawing Sheets

Day 1

Day 2

Day 3

Day 4

Day 5

Day 7

ARTIFICIAL CELL FOR SINGLE-CELL MASS SPECTROMETRY (SCMS) MEASUREMENT AND PREPARATION METHOD THEREOF

CROSS REFERENCE TO RELATED APPLICATION

The present application is a national stage application of International Patent Application No. PCT/CN2023/116383, filed on Sep. 1, 2023, which claims priority to the Chinese Patent Application No. 202310272610.6, filed with the China National Intellectual Property Administration (CNIPA) on Mar. 20, 2023, and entitled "ARTIFICIAL CELL FOR SINGLE-CELL MASS SPECTROMETRY (SCMS) MEASUREMENT AND PREPARATION METHOD THEREOF", which is incorporated herein by reference in its entirety.

TECHNICAL FIELD

The present disclosure belongs to the technical field of cell biology, and specifically relates to an artificial cell for single-cell mass spectrometry (SCMS) measurement and a preparation method thereof.

BACKGROUND

In recent years, as a label-free detection technology with high sensitivity and specificity, single-cell mass spectrometry (SCMS) has been increasingly used in the measurement of single-cell metabolomics and proteomics. Although there are currently some other commonly used single-cell measurement methods (such as electrochemical methods and fluorescence methods), these methods generally require molecules to be measured to have specific physical and chemical properties (redox properties) or need to modify molecular structures (fluorescent labeling). This greatly limits the application scope of these methods. Compared with these methods, the SCMS can achieve highly-sensitive simultaneous detection of multiple biomolecules in cells without the need for amplification or labeling. Secondly, mass spectrometry (MS) can also achieve structural analysis of unknown compounds in a single cell by using the characteristic fragment information of molecules through multi-level fragmentation. In addition, through isotope labeling, SCMS can track the metabolic process of specific compounds without affecting the metabolic behavior of cells. At the same time, isotope dilution is currently a quantitative analysis method with the highest stoichiometry level and can directly trace the Système International d'Unités (International System of Units, SI). These excellent characteristics make the SCMS have desirable application prospects in the precise measurement of chemical components in single cells.

At present, SCMS analysis technology has achieved qualitative and quantitative analysis of some compounds within single cells. However, due to the significant individual differences and instability of physiological states in natural single cells, SCMS measurement studies still suffer from great inaccuracy and unreliability. First of all, there are an unusually wide variety of cells in nature. These cells can be divided into plant cells, animal cells, nerve cells, white blood cells, red blood cells, platelets, phagocytes, epithelial cells, cardiomyocytes, stem cells, and cancer cells and the like. Secondly, cells of a same type may also show significant differences in size, appearance, and internal omics due to their different growth stages in the organisms. These factors lead to significant sampling and measurement differences when conducting SCMS methodology research or analytical measurements, leading to problems such as poor reproducibility, low stability, and untraceable measurement results in the final measurement results.

In order to better study the physical and chemical properties and biological functions of cells, such as microscopic anatomy, signaling networks, omics libraries, and gene regulation, the concept of "artificial cell" has been widely proposed by scientists. Currently, various types of ideal artificial cell models have been developed in the field, including: liposomes, polymersomes, and vesosomes. These artificial cells can simulate the structure of cell compartments, internal compound types, and biochemical functions on the cell membrane surface through structural regulation of vesicle materials, encapsulation of target molecules, and modification of functional molecules based on the structure and physiological characteristics of the cells. Ultimately, the artificial cells are successfully used to study the physical and chemical properties and biological functions of various types of cells. Among these artificial cell models, liposomes have received the most widespread attention and reports. Liposomes are generally composed of naturally-synthesized phospholipid bilayers or vesicles prepared from artificial self-assembled materials, and have attracted widespread interest in the fields of targeted drug delivery, membrane protein research, bioreactors, and biosensors. The liposomes can simulate the size of a single living cell through the regulation of amphipathic molecular segments, and characteristics of encapsulating biomolecules and carrying specific molecular physiological functions make the liposome a potential substitute for SCMS research.

After recent years of development, research on the preparation methods of artificial cells has achieved certain results, achieving preliminary simulation and construction of the basic structure and biochemical properties of natural cells. However, the current development of liposome-based artificial cells for SCMS measurement is still in a blank stage. The main reasons are as follows:

First, artificial cells for SCMS measurement are difficult to prepare in a uniform and batch manner. Currently, conventional methods for synthesizing artificial cells include porous membrane extrusion, electrodeposition, reverse-phase evaporation, droplet emulsion transfer, and freeze-drying. These traditional methods generally result in polydispersed liposomes and differentiated structures. There is still a lack of batched and homogenized preparation platform for artificial cells.

Second, liposome-based artificial cells have poor stability and encapsulation efficiency. In the prior art, vesicle materials synthesized by conventional methods of liposomes are generally prone to rupture while internal compounds thereof are easily lost, thus greatly limiting applications in the SCMS measurement and resulting in unstable and inaccurate single-cell measurement results. Moreover, existing liposome encapsulation modes are not conducive to the convenient introduction of compounds, causing inaccuracy during the quantitative encapsulation of the compounds.

SUMMARY

In view of the above-mentioned deficiencies in the prior art, an objective of the present disclosure is to provide an artificial cell for single-cell mass spectrometry (SCMS) measurement and a preparation method thereof. In the present disclosure, the batched, uniform, and stable preparation is achieved for an artificial cell with different physiological characteristics. Moreover, the unification and mutual comparability of the SCMS measurement are realized through the application of artificial single-cell materials in SCMS measurement research.

To achieve the above objective, the present disclosure adopts the following technical solutions:

In a first aspect, the present disclosure provides an artificial cell for SCMS measurement, including an internal aqueous phase, an intermediate oil phase, and an external aqueous phase; where the internal aqueous phase includes polyethylene glycol (PEG) and a polyvinyl alcohol (PVA) aqueous solution, and the intermediate oil phase includes a chloroform-hexane mixture of L-α-phosphatidylcholine; and the external aqueous phase includes PVA and an F-68 aqueous solution.

In a second aspect, the present disclosure provides a preparation method of the artificial cell for SCMS measurement, including the following steps:

S1, building a microfluidic platform for artificial cell preparation:

the microfluidic platform is a three-phase channel, including an internal aqueous phase channel, an oil phase channel, and an external aqueous phase channel; a size and a structure of the artificial cell, a speed of preparation, and a microstructure of the artificial cell are regulated by controlling a width, a flow rate, and a compound composition of the channels; and S2, preparing a double-emulsion liposome-derived artificial cell based on microfluidic self-assembly:

substances are added into the three-phase channel and emulsion droplets are squeezed out through an aqueous solution to form a primary vesicle structure of an oil-water two-phase structure; and the primary vesicle structure automatically forms the artificial cell.

Further, the internal aqueous phase channel is an intermediate channel; the oil phase channel is divided into two sub-channels on two sides of the internal aqueous phase channel; and the external aqueous phase channel is divided into two sub-channels outside the internal aqueous phase channel.

Further, in step S2, the PEG and the PVA aqueous solution are added into the internal aqueous phase channel; the chloroform-hexane mixture of the L-α-phosphatidylcholine is added into the intermediate oil phase channel; and the PVA and the F-68 aqueous solution are added into the external aqueous phase channel.

Further, an organic dye or a fluorescent dye is further added into the internal aqueous phase channel in step S2 in order to clearly observe and collect a target artificial cell.

Further, in step S2, target compounds of different contents are added into the internal aqueous phase channel in order to accurately simulate an omics environment of an internal single cell; and the target compound includes adenosine triphosphate (ATP).

The present disclosure has the following beneficial effects:

Compared with natural cell samples, new artificial single cells based on microfluidic self-assembly provided by the present disclosure have better uniformity, stability, and controllability. The artificial cell can effectively avoid significant measurement differences between individual single-cell samples, and effectively solve the problem of difficulty in stably preserving biological samples. The proposal of the preparation method of the artificial cell can largely avoid the lack of standard reference materials in the field of SCMS measurement, thereby making SCMS methodology research results more accurate, reliable, and mutually comparable.

DETAILED DESCRIPTION OF THE EMBODIMENTS

The specific embodiment of the present disclosure will be described below so that those skilled in the art can understand the present disclosure, but it should be clear that the present disclosure is not limited to the scope of the specific embodiment. For those of ordinary skill in the art, as long as various changes fall within the spirit and scope of the present disclosure defined and determined by the appended claims, these changes are apparent, and all inventions and creations using the concept of the present disclosure are protected.

Example 1

Referring to FIG. 1 to FIGS. 3A-C, this example provided a preparation method of an artificial cell for SCMS measurement, including the following steps:

(1) a Microfluidic Platform was Built for Artificial Cell Automatic Preparation:

In order to realize the homogenized, stabilized, and batched production of artificial cells, it was first planned to design and build a set of the microfluidic platform for the preparation of artificial cells. The microfluidic platform was composed of a three-phase channel, including: an internal aqueous phase channel (W1), an oil phase channel (O), and an external aqueous phase channel (W2). A three-phase liquid was introduced through five microfluidic channels, of which a W1 channel was an intermediate channel; there was one O channel on each side of the intermediate channel; and there was one W2 channel on an outside of each of the two O channels. A size and a structure of the artificial cell, a speed of preparation, and a microstructure of the artificial cell were regulated by controlling a width, a flow rate, and a compound composition of the channels.

(2) A Double-Emulsion Liposome-Derived Artificial Cell Based on Microfluidic Self-Assembly was Prepared:

In order to further achieve homogeneous, batch-based, and parameter-controllable preparation of an artificial single cell, it was planned to develop a preparation method of a water-in-oil-in-water (W/O/W) double-emulsion liposome-derived artificial cell based on a microfluidic device. The double-emulsion liposome-derived artificial cell was mainly composed of a three-phase liquid, including: an internal aqueous phase (W1), an intermediate oil phase (O), and an external aqueous phase (W2). The W1 phase was mainly composed of PEG and a PVA aqueous solution; the O phase was mainly composed of a chloroform-hexane mixture of L-α-phosphatidylcholine (PC); and the W2 phase was mainly composed of PVA and an F-68 aqueous solution.

Figure 1:
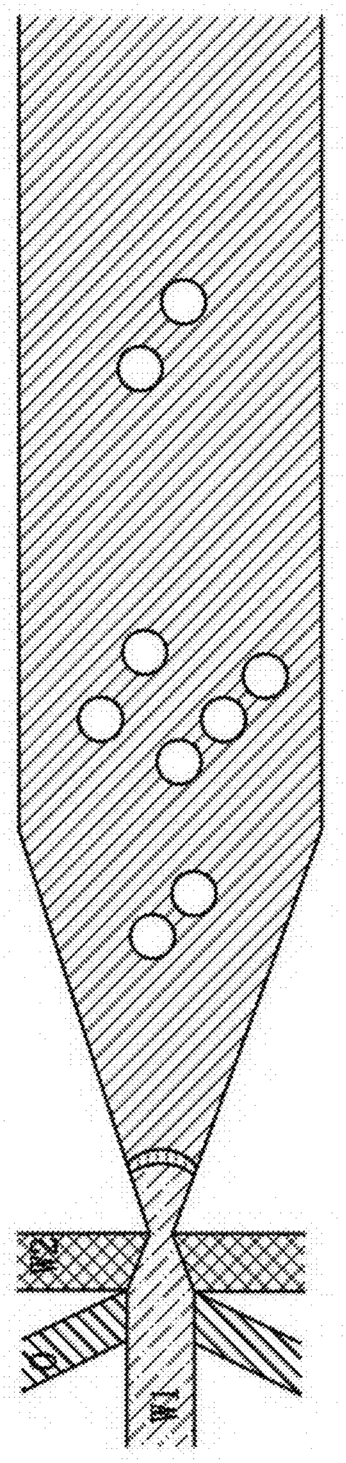
FIG. 1 shows a schematic diagram of a microfluidic platform for artificial cell preparation built in Example 1; where W1 is the internal aqueous phase, O is the intermediate oil phase, and W2 is the external aqueous phase.
Figure 2:
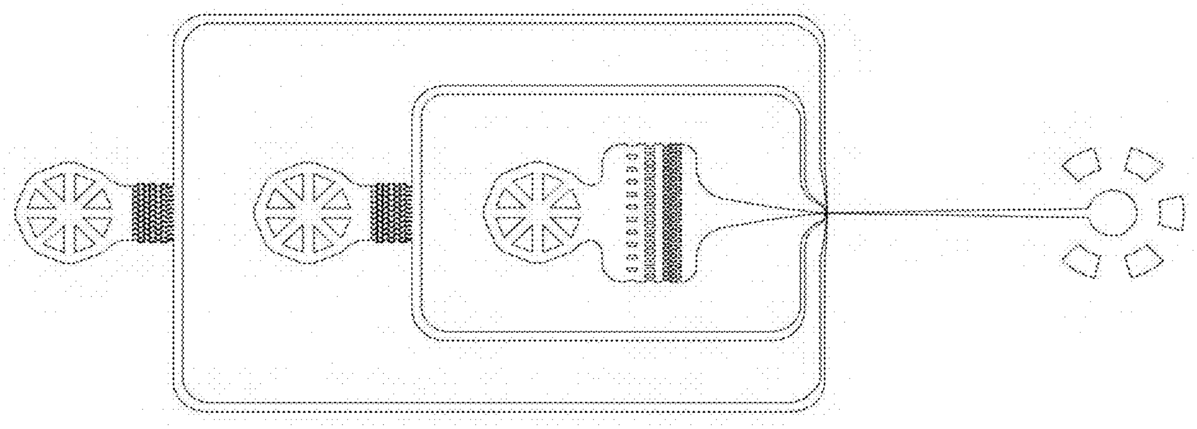
FIG. 2 shows a CAD structural design drawing of the microfluidic platform for artificial cell preparation built in Example 1.
Figure 3A:
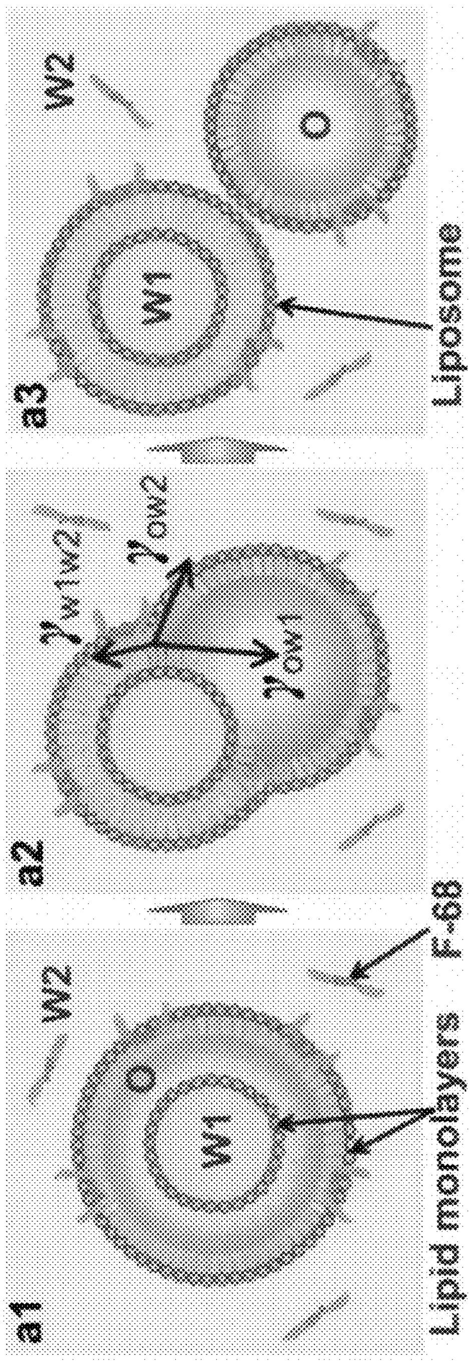
FIGS. 3A-C show schematic diagrams of a preparation method of a double-emulsion liposome-based artificial cell in Example 1.
Figure 3B:
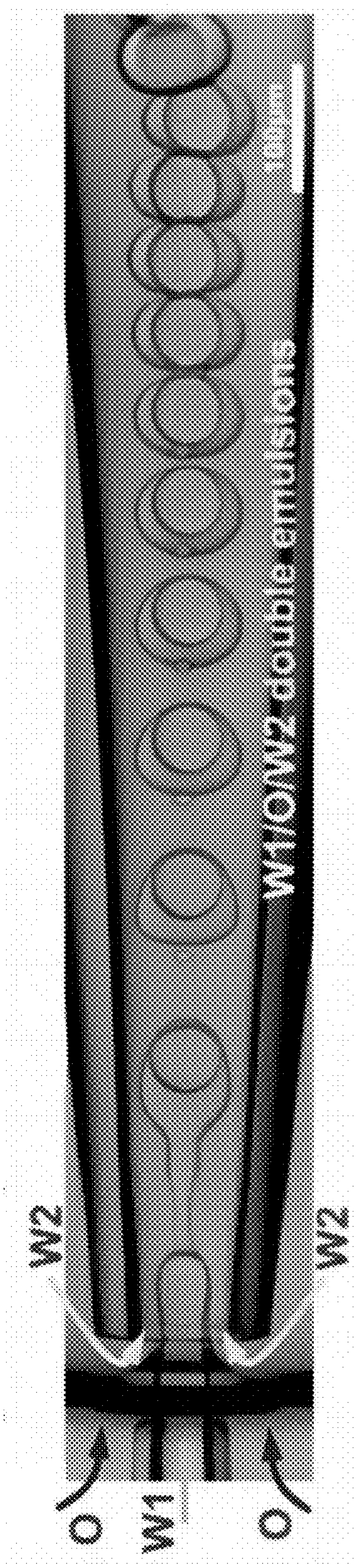
Figure 3C:
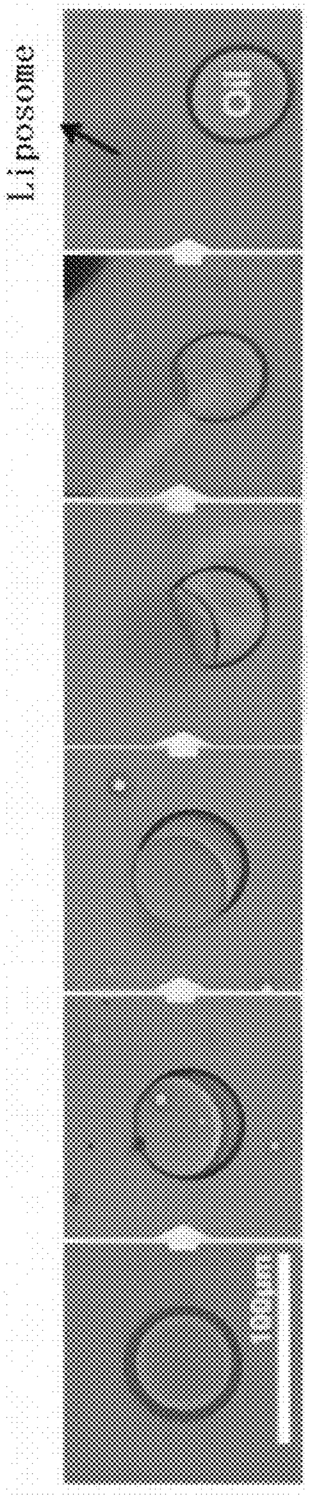

The preparation principle was shown in FIGS. 3A-C: emulsion droplets were extruded through an aqueous solution to form a primary vesicle structure with an oil-water double-phase structure. Over time, a layer of lipid molecules was formed at an interface of the "vesicle", and a doped stabilizer and excess lipids might gather together at the interface to form a small bulge. These redundant "small bulges" could automatically separate to form a small droplet, which was separated from the prepared artificial cell, such that an artificial cell wrapped by a lipid membrane was completed. The prepared double-emulsion liposome-derived artificial cell could subsequently be collected in a sealed container and observed under a microscope.

This method pre-selected PC, a common phospholipid molecule, for the construction of artificial cell lipid membranes, which could spontaneously form a double-emulsion vesicle structures in microfluidics, simulating the topography of cell membranes. In addition, this method adopted amphipathic macromolecular polymers PEG and PVA to improve the preparation success rate and stability of the emulsion, and was also planned to achieve high stability and uniformity of emulsion vesicles through optimization for a proportion of different polymers.

In order to clearly observe and collect a target artificial cell, an organic dye or fluorescent dye could be added to the internal aqueous phase to achieve better positioning of the artificial cell under the microscope. Moreover, in order to accurately simulate the omics environment of an internal single cell, target compounds (such as ATP, a common compound in cells) of different contents could be added to the internal aqueous phase for mass spectrometry research on compounds within the single cells. Through the control of different compound parameters, precisely quantitative optimization of size, appearance, and internal compound content of the artificial cell could be achieved, thereby enabling methodological research on SCMS metrology and evaluation of measurement accuracy.

Example 2

Evaluation of Homogeneity, Stability, and Measurement Accuracy of the Artificial Single Cell:

In order to prove the superiority of the prepared target artificial cell material, a series of parameters of the target material were characterized in this example. First, the uniformity and stability of the artificial cell materials were evaluated.

Figure 4:
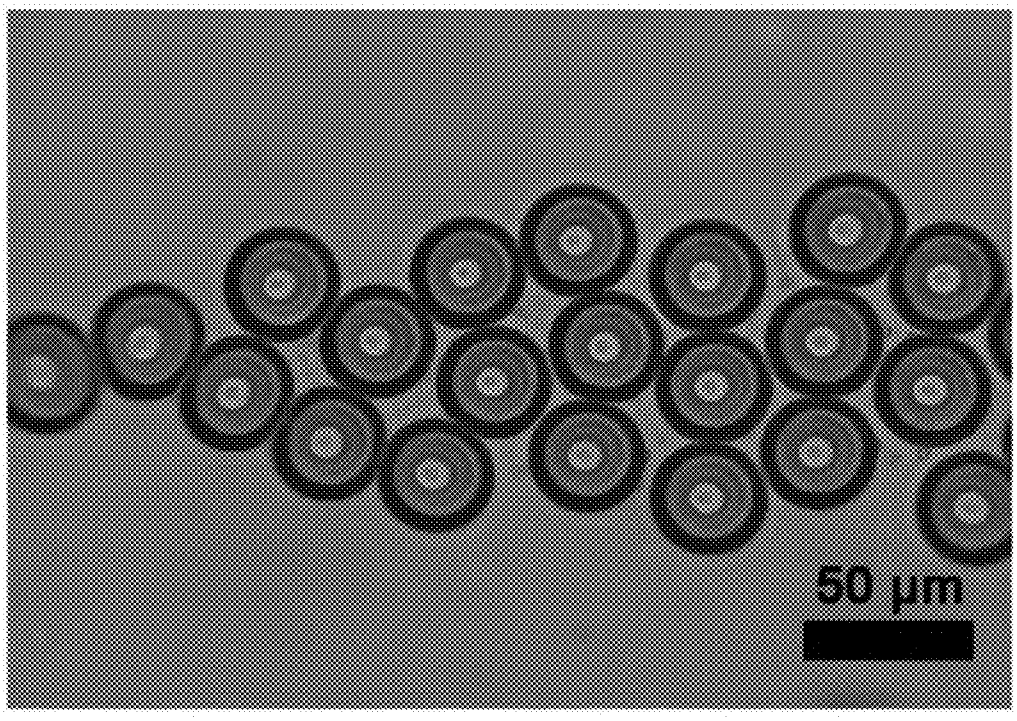
FIG. 4 is a morphological structure for homogeneity evaluation of the artificial cell in Example 2.
Figure 5A:
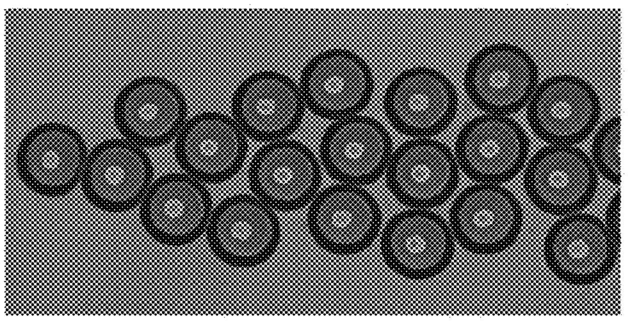
FIGS. 5A-F are morphological structures for stability evaluation of the artificial cell in Example 2.
Figure 5B:
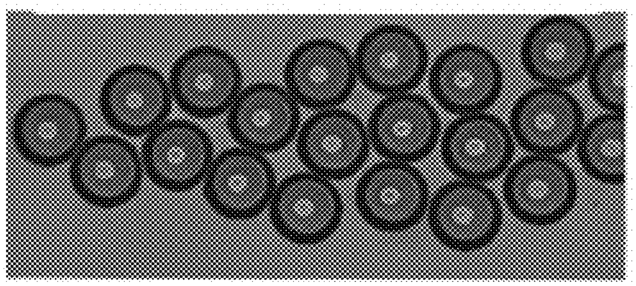
Figure 5C:
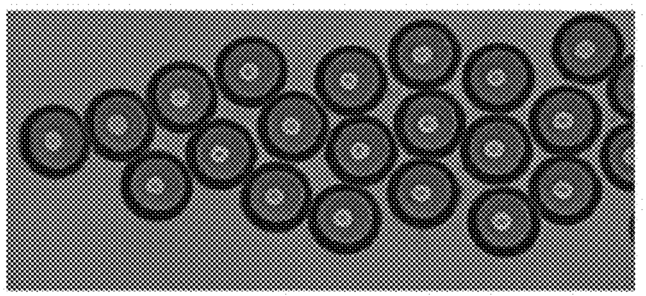
Figure 5D:
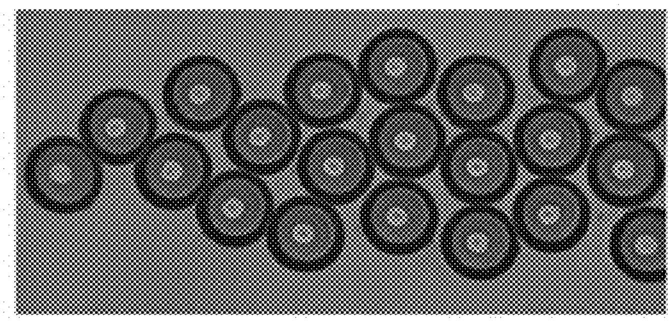
Figure 5E:
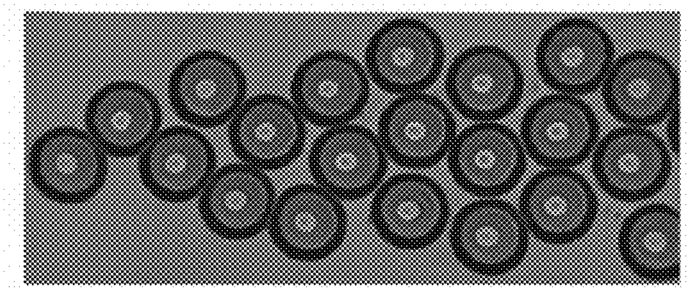
Figure 5F:
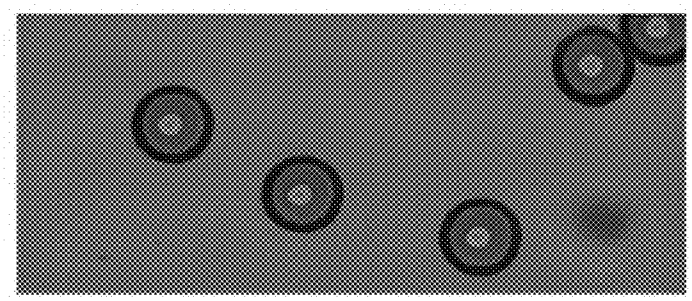

W/O/W artificial cell vesicles could maintain a relatively uniform morphological structure (FIG. 4), with a size of approximately (28.75±1.92) μm. Dynamic light scattering results show that the particle size distribution was consistent with dynamic distribution. This proved that the artificial cell material showed desirable homogeneity. In order to prove the stability of the material, the target artificial cell material was tested for different days. The stability of the artificial cell was observed under the microscope for 1 d, 2 d, 3 d, 4 d, 5 d, and 7 d, and the results were shown in FIGS. 5A-F. The results showed that the phospholipid W/O/W artificial cell could be stored for about 7 d, and the artificial cell material had a high stability.

Figure 6:
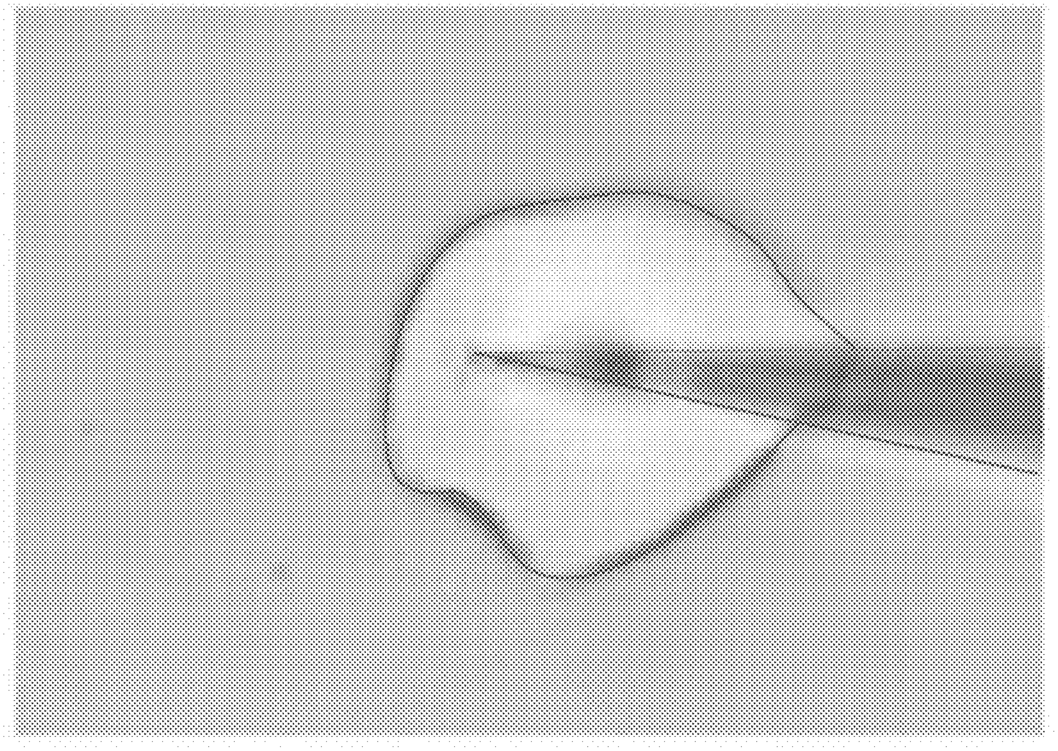
FIG. 6 shows an actual photo of single cell sampling through a droplet microextraction process in Example 2.

In order to better realize the application of SCMS metrology, the uniformity, stability, and accuracy of artificial cell measurement were investigated. A representative compound ATP in cells was selected to simulate the mass spectrometry detection of specific compounds in single cells; by preparing artificial cells wrapped with the specific metabolite ATP, the measurement evaluation of artificial cells was achieved for SCMS measurement. Single cells were sampled through droplet microextraction, and a microextraction droplet had a volume of about 1 nL. The sampling was shown in FIG. 6. The obtained extracts were measured by nanospray mass spectrometry.

Figure 7:
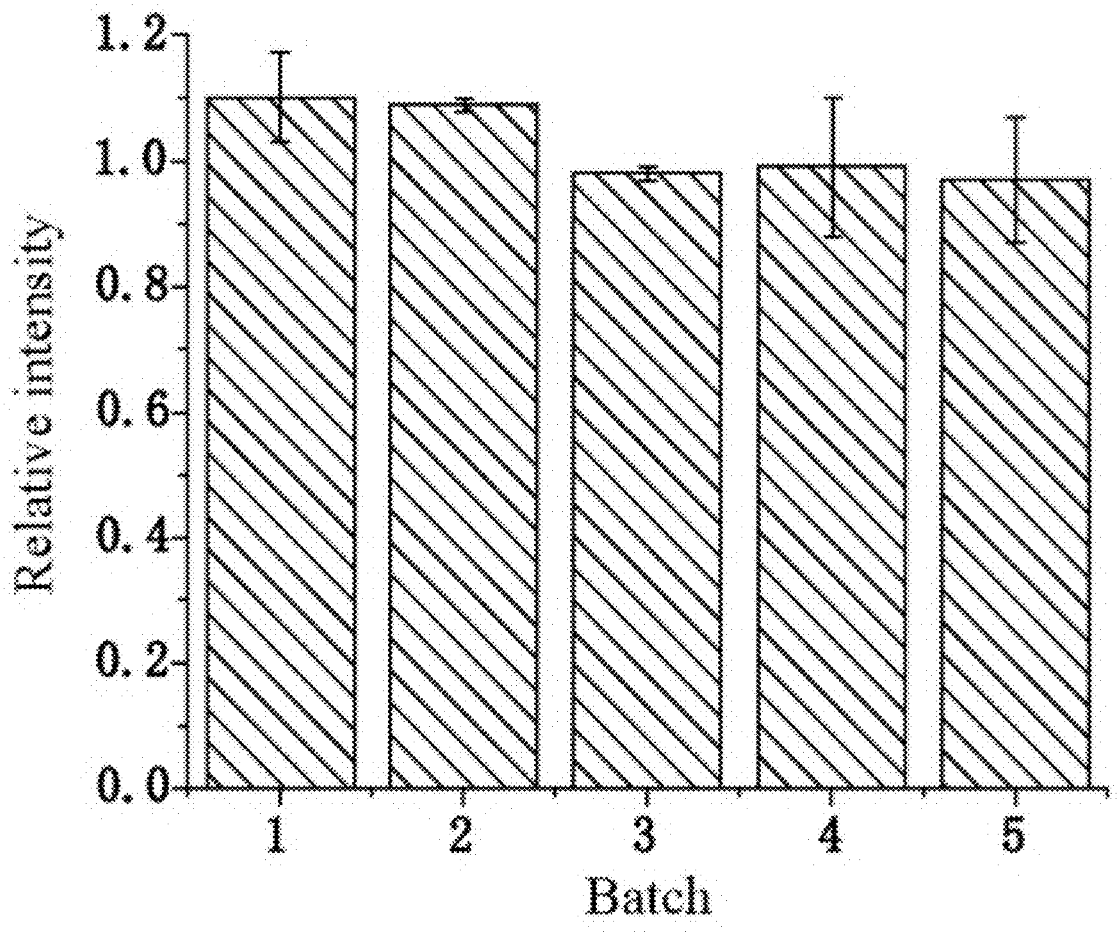
FIG. 7 shows uniformity evaluation of single cell measurement in different batches in Example 2.
Figure 8:
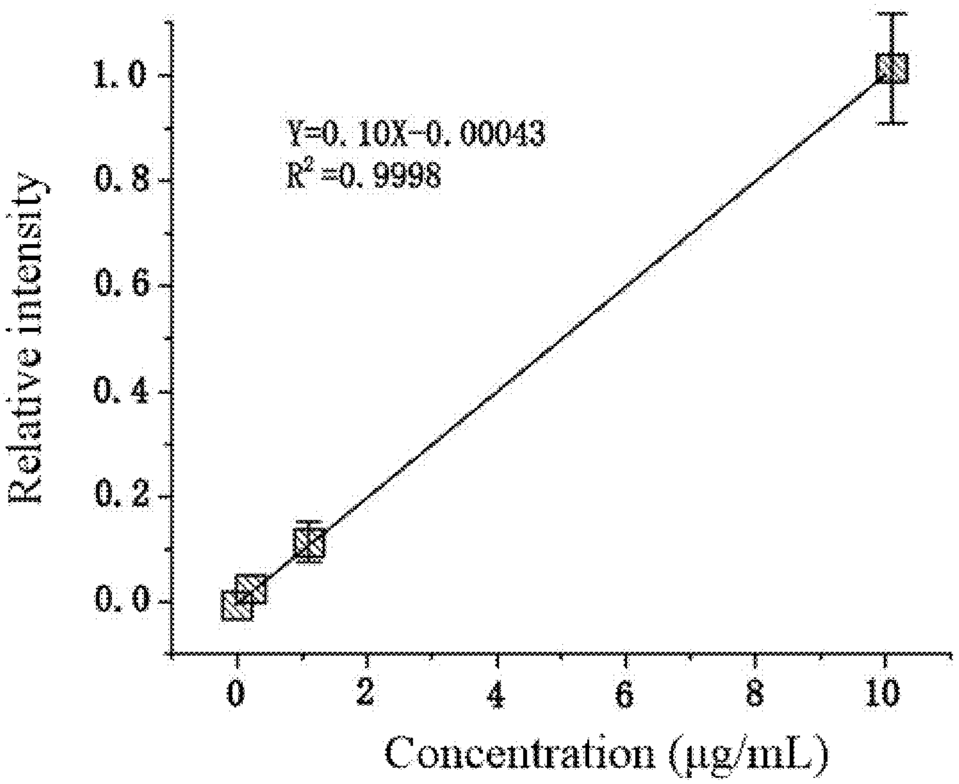
FIG. 8 shows a detection curve of an ATP concentration of the single cell in Example 2.
Figure 9:
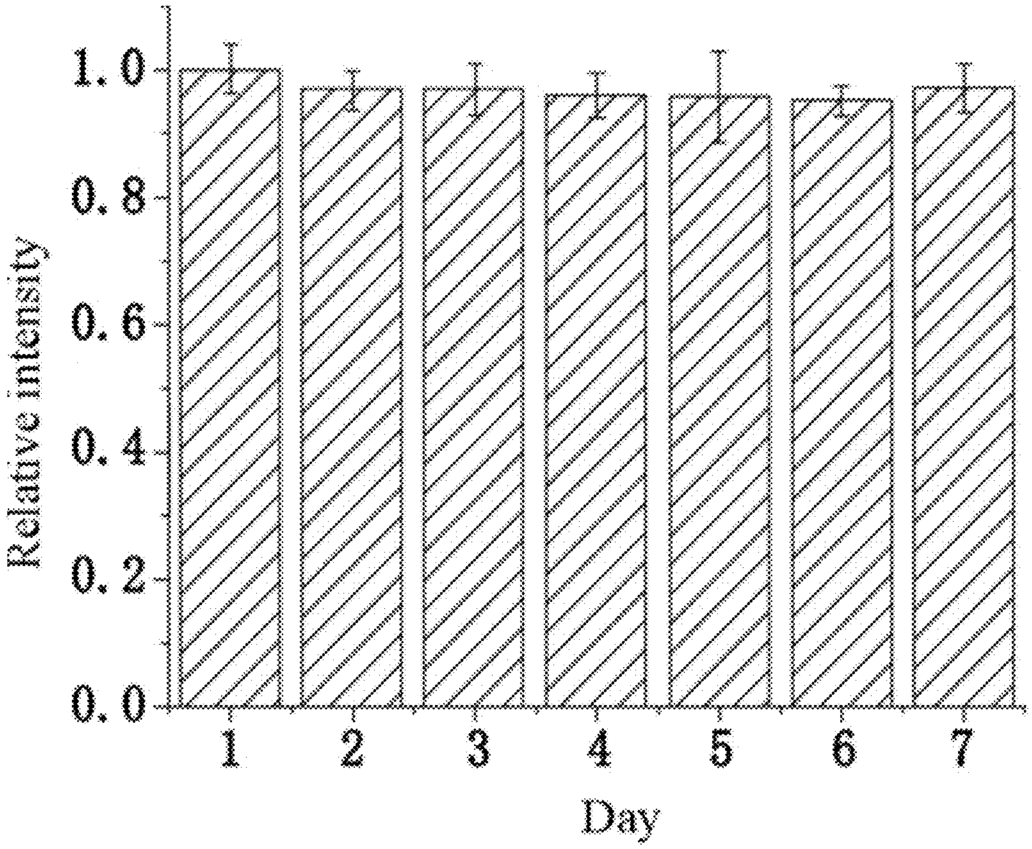
FIG. 9 shows ATP measurement results in the single cell at different times in Example 2.

First, the measurement uniformity of artificial cell was investigated: the measurement of artificial single-cell compounds was compared in different batches, where each batch was measured 5 times, and an ATP concentration was 1 μg/mL. The measurement results were shown in FIG. 7. In addition, different batches of artificial cells containing different concentrations of ATP were measured: the linear results were shown in FIG. 8, a linear correlation coefficient was 0.9998, indicating that the linear results were desirable. The results demonstrated that the artificial cell had high measurement uniformity. In order to evaluate the measurement stability of artificial cell, the appearance and size of artificial cell and the measurement of intracellular compounds were compared at different time intervals: the ATP content in artificial cells was measured for 1 d to 7 d to evaluate a cell stability. The measurement results were shown in FIG. 9. The results demonstrated that the artificial cell had high measurement stability.

Compared with natural cell samples, new artificial single cells based on microfluidic self-assembly developed by the present disclosure have better uniformity, stability, and controllability. The artificial cell can effectively avoid significant measurement differences between individual single-cell samples, and effectively solve the problem of difficulty in stably preserving biological samples. The proposal of the preparation method of the artificial cell can largely avoid the lack of standard reference materials in the field of SCMS measurement, thereby making SCMS methodology research results more accurate, reliable, and mutually comparable.

For those skilled in the art, it is obvious that the present disclosure is not limited to the details of the above embodiments, and the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure.

In addition, it should be understood that although this specification is described in accordance with the implementations, not each implementation only contains an independent technical solution, and this description in the specification is only for clarity. Those skilled in the art should take the specification as a whole. The technical solutions in the embodiments can also be properly combined to form other implementations that can be understood by those skilled in the art.

What is claimed is:

1. An artificial cell for single-cell mass spectrometry (SCMS) measurement, comprising an internal aqueous phase, an intermediate oil phase, and an external aqueous phase; wherein the internal aqueous phase comprises polyethylene glycol (PEG) and a polyvinyl alcohol (PVA) aqueous solution, and the intermediate oil phase comprises a chloroform-hexane mixture of L-α-phosphatidylcholine; and the external aqueous phase comprises PVA and an F-68 aqueous solution.

2. A preparation method of the artificial cell according to claim 1, comprising the following steps:

S1, building a microfluidic platform for artificial cell preparation:

the microfluidic platform is a three-phase channel, comprising an internal aqueous phase channel, an oil phase channel, and an external aqueous phase channel; a size and a structure of the artificial cell, a speed of preparation, and a microstructure of the artificial cell are regulated by controlling a width, a flow rate, and a compound composition of the channels; and S2, preparing a double-emulsion liposome-derived artificial cell based on microfluidic self-assembly:

substances are added into the three-phase channel and emulsion droplets are squeezed out through an aqueous solution to form a primary vesicle structure of an oil-water two-phase structure; and the primary vesicle structure automatically forms the artificial cell; wherein in step S2, the PEG and the PVA aqueous solution are added into the internal aqueous phase channel;

the chloroform-hexane mixture of the L-α-phosphatidylcholine is added into the oil phase channel; and the PVA and the F-68 aqueous solution are added into the external aqueous phase channel.

3. The preparation method of the artificial cell according to claim 2, wherein the internal aqueous phase channel is an intermediate channel; the oil phase channel is divided into two sub-channels located on two sides of the internal aqueous phase channel; and the external aqueous phase channel is divided into two sub-channels outside the internal aqueous phase channel.

4. The preparation method of the artificial cell according to claim 2, wherein an organic dye or a fluorescent dye is further added into the internal aqueous phase channel in step S2.

5. The preparation method of the artificial cell according to claim 2, wherein in step S2, target compounds of different contents are added into the internal aqueous phase channel; and the target compound comprises adenosine triphosphate (ATP).

* * * * *